United States Patent
Rollinger (10) Patent No.: US 9,599,504 B2
(45) Date of Patent: Mar. 21, 2017

(54) FIBER OPTIC VIBRATION DETECTION

(71) Applicant: Raytheon Company, Waltham, MA (US)

(72) Inventor: Andrew R. Rollinger, Topanga, CA (US)

(73) Assignee: Raytheon Company, Waltham, MA (US)

( * ) Notice: Subject to any disclaimer, the term of this patent is extended or adjusted under 35 U.S.C. 154(b) by 446 days.

(21) Appl. No.: 13/954,507

(22) Filed: Jul. 30, 2013

(65) Prior Publication Data

US 2015/0033865 A1 Feb. 5, 2015

(51) Int. Cl.
  *G01V 1/00* (2006.01)
  *G01V 1/20* (2006.01)
  *G01H 9/00* (2006.01)

(52) U.S. Cl.
  CPC .............. *G01H 9/004* (2013.01); *G01V 1/001* (2013.01); *G01V 1/20* (2013.01); *G01V 2210/1429* (2013.01)

(58) Field of Classification Search
  CPC .......... G01H 9/004; G01V 1/20; G01V 1/001; G01V 2210/1429
  USPC .................................................. 73/649, 655
  See application file for complete search history.

(56) References Cited

U.S. PATENT DOCUMENTS

| | | | |
|---|---|---|---|
| 4,752,132 A | 6/1988 | Pavlath | |
| 5,276,322 A | 1/1994 | Carome | |
| 6,246,638 B1 | 6/2001 | Zook et al. | |
| 6,763,723 B1 | 7/2004 | Zook et al. | |
| 6,895,131 B1 * | 5/2005 | Twerdochlib | G01D 11/245 385/12 |
| 6,972,400 B2 * | 12/2005 | Halmos | 250/227.11 |
| 7,073,384 B1 * | 7/2006 | Donskoy et al. | 73/657 |
| 7,992,440 B2 | 8/2011 | Kumagai et al. | |
| 2009/0260501 A1 * | 10/2009 | Kashyap | G01H 9/004 84/297 S |
| 2010/0277720 A1 | 11/2010 | Hammons | |
| 2011/0274386 A1 | 11/2011 | Bosselmann et al. | |
| 2011/0320147 A1 * | 12/2011 | Brady et al. | 702/66 |
| 2012/0067118 A1 * | 3/2012 | Hartog et al. | 73/152.16 |

(Continued)

FOREIGN PATENT DOCUMENTS

| CN | 101858488 | * 10/2010 |
|---|---|---|
| EP | 0354882 B1 | 2/1990 |

(Continued)

OTHER PUBLICATIONS

International Search Report dated Dec. 22, 2014, in connection with PCT/US2014/039711, 5 pages.

(Continued)

*Primary Examiner* — J M Saint Surin (57) ABSTRACT

An apparatus to detect vibration is provided. The apparatus comprises an optical transmitter and an optical receiver. The optical transmitter is configured to send an optical signal that is modified by a vibration sensor. The optical receiver configured to receive the optical signal from the vibration sensor, the optical signal comprising fluctuations responsive to vibration of the vibration sensor. The optical signal includes a radio frequency (RF) signal. The vibration sensor is comprised by an optical assembly configured to detect underground vibrations.

22 Claims, 4 Drawing Sheets

(56) References Cited

U.S. PATENT DOCUMENTS

2012/0176250 A1   7/2012  Duncan et al.
2012/0224169 A1   9/2012  Kumagai et al.
2015/0131103 A1*  5/2015  Goldner et al. .............. 356/478

FOREIGN PATENT DOCUMENTS

GB           2189880 A     11/1987
WO    WO 2012-072973 A1    6/2012
WO    WO 2012-076873 A2    6/2012

OTHER PUBLICATIONS

Written Opinion of the International Searching Authority dated Dec. 22, 2014, in connection with PCT/US2014/039711, 4 pages.

* cited by examiner

FIBER OPTIC VIBRATION DETECTION

TECHNICAL FIELD

The present disclosure is directed in general to vibration detection and more specifically to vibration detection using optical equipment.

BACKGROUND OF THE DISCLOSURE

Underground tunnels can be used to smuggle weapons, contraband, and people across borders undetected. Detection of tunneling activity can be used to help secure borders. Tunneling detection is impaired by the large expanses of land to be monitored in order to detect tunneling and related activity.

SUMMARY OF THE DISCLOSURE

A method of a vibration sensor system is provided. The method comprises sending, via an optical transmitter, an optical signal that is modified by a vibration sensor. The method comprises receiving, via an optical receiver, the optical signal from the vibration sensor, the optical signal comprising fluctuations responsive to vibration of the vibration sensor. The optical signal includes a radio frequency (RF) signal. The vibration sensor is comprised by an optical assembly configured to measure underground vibrations.

A system to measure vibration is provided. The system comprises an optical transmitter and an optical receiver. The optical transmitter is configured to send an optical signal that is modified by a vibration sensor. The optical receiver configured to receive the optical signal from the vibration sensor, the optical signal comprising fluctuations responsive to vibration of the vibration sensor. The optical signal includes a radio frequency (RF) signal. The vibration sensor is comprised by an optical assembly configured to measure underground vibrations.

An apparatus to measure vibration is provided. The apparatus comprises an optical transmitter and an optical receiver. The optical transmitter is configured to send an optical signal that is modified by a vibration sensor. The optical receiver configured to receive the optical signal from the vibration sensor, the optical signal comprising fluctuations responsive to vibration of the vibration sensor. The optical signal includes a radio frequency (RF) signal. The vibration sensor is comprised by an optical assembly configured to measure underground vibrations.

Although specific advantages have been enumerated above, various embodiments may include some, none, or all of the enumerated advantages. Additionally, other technical advantages may become readily apparent to one of ordinary skill in the art after review of the following figures and description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
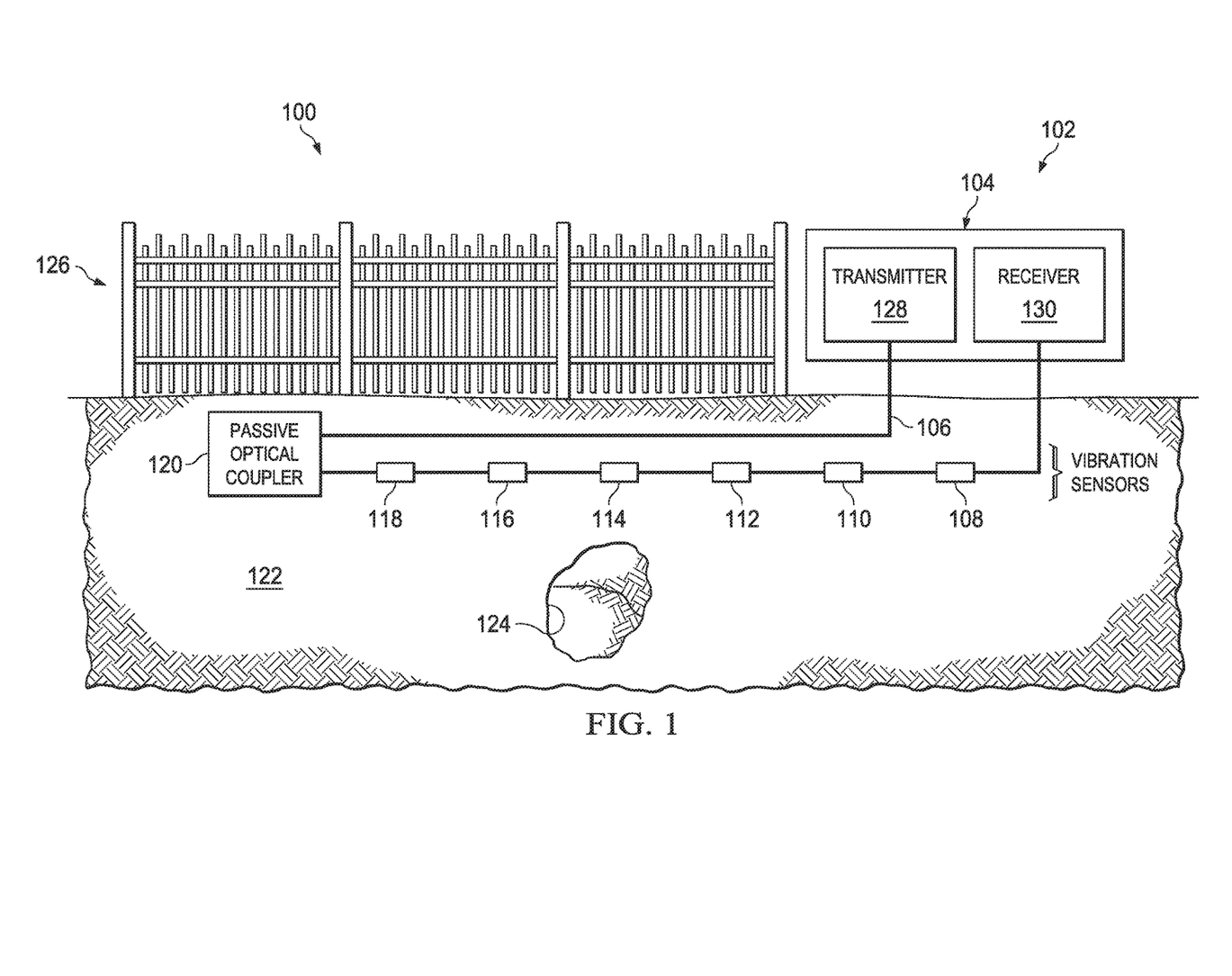
FIG. 1 illustrates a vibration detection system according to an embodiment of the disclosure.

FIG. 1 illustrates a vibration detection system according to an embodiment of the disclosure. The embodiment illustrated in FIG. 1 is for illustration only. Other embodiments could be used without departing from the scope of this disclosure.

An environment 100 includes a fence 126, a ground 122, and a tunneling detection system 102. The environment 100 can be a border of a country, a property line of a parcel of land, and the like. The environment 100 is not limited to borders and boundaries and can comprise any portion or expanse of land or territory.

The fence 126 can be a freestanding structure to restrict movement across a boundary such as a border of a country or a property line between parcels of land. Although illustrated as being disposed beneath the fence 126, the optical assembly 106 can be disposed over any expanse of land, with or without a fence.

The ground 122 comprises a tunnel 124. Activity related to the tunnel 124 is detected by the vibration detection system 102. Activities related to the tunnel 124 include, but are not limited to, building, maintaining, using, and the like.

The vibration detection system 102 detects activity related to the tunnel 124 in the ground 122 beneath the fence 126. Although described as detecting tunnel activities in this configuration, the vibration detection system 102 may detect other underground activities in other configurations.

The vibration detection system 102 comprises an optical transmitter and receiver 104 and an optical assembly 106. The optical transmitter and receiver 104 comprise an optical transmitter 128, which can include a laser, and an optical receiver 130, which can include a photodiode. The optical transmitter and receiver 104 send and receive one or more optical signals through the optical assembly 106. Although shown together, certain embodiments can have optical transmitter 128 and optical receiver 130 at different locations. The optical transmitter 128 sends an original optical signal that is modified via vibration sensors 108 to 118. The optical receiver 130 receives the modified optical signal from the vibration sensors 108 to 118.

The optical assembly 106 comprises a passive optical coupler 120, the vibration sensors 108 to 118, and one or more optical fibers. The optical assembly 106 does not comprise active optical components. The optical assembly 106 comprises one or more single mode fibers (SMFs) to carry optical signals between the optical transmitter and receiver 104, the optical coupler 120, and the vibration sensors 108 to 118. A single optical fiber may carry an original optical signal from a laser of the optical transmitter 128 to the optical coupler 120. One or more optical fibers may carry the optical signal from the optical coupler 120 through the vibration sensors 108 to 118 to one or more photodiodes of the optical receiver 130.

The optical coupler 120 is a passive component that comprises an optical splitter configured to split an incoming optical signal into multiple optical signals that are carried via one or more optical fibers. The optical coupler 120 receives the original signal from the optical transmitter 128, splits the original signal into multiple signals, and sends the multiple signals to one or more of the vibration sensors 108 to 118.

The vibration sensors 108 to 118 each comprise a set of ferrules or a V groove block configured to detect vibration via oscillations of optical fiber. Each of the vibration sensors 108 to 118 modifies an input signal to generate a modified output signal that fluctuates based on movement or vibration of the vibration sensor. The output signal comprising the fluctuations is sent to and received by the optical receiver 130 via the optical assembly 106. Fluctuations of optical signals allow for the vibration detection system 102 to detect activity related to the tunnel 124 in the ground 122 beneath the fence 126.

Figure 2:
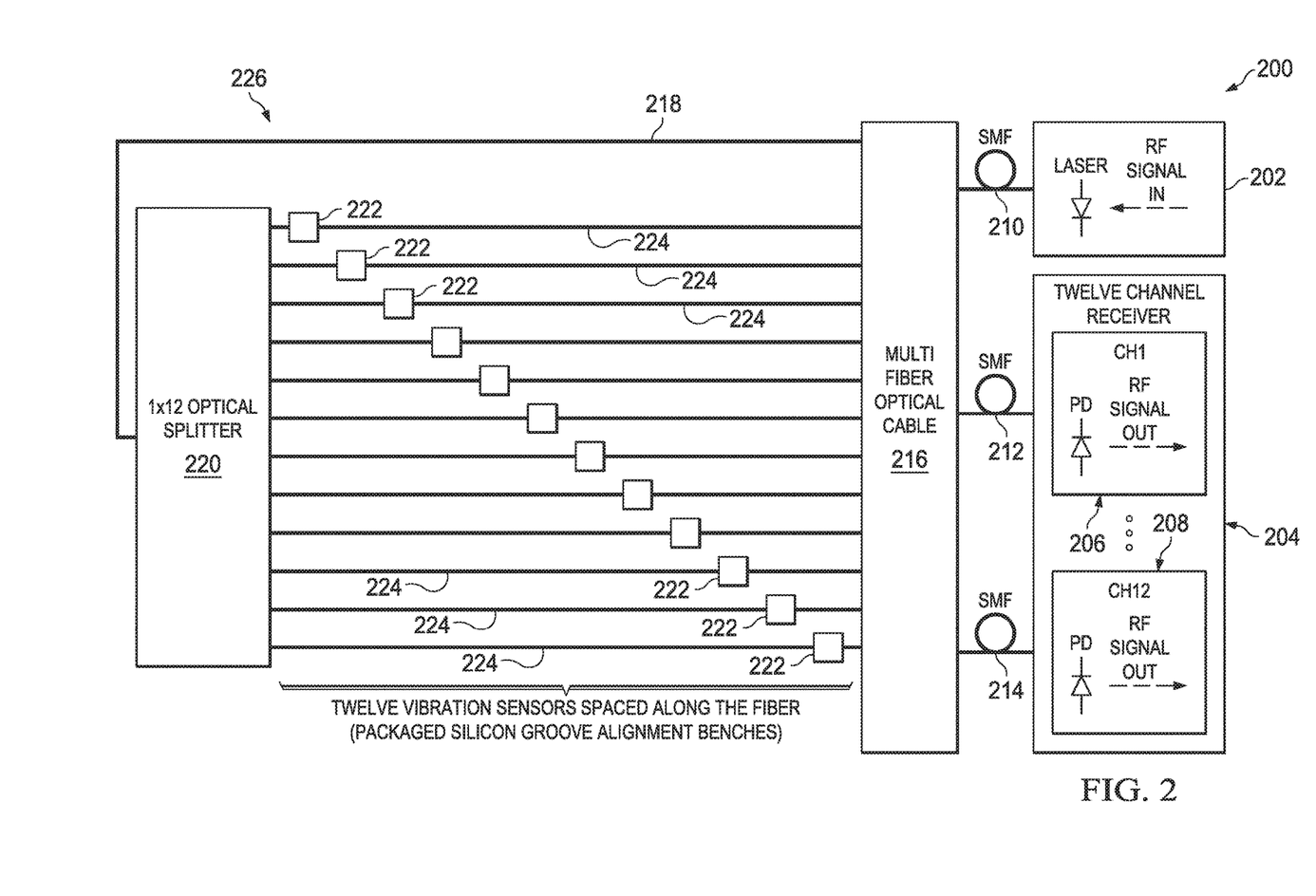
FIG. 2 illustrates a vibration detection system according to an embodiment of the disclosure.

FIG. 2 illustrates a vibration detection system 200 according to an embodiment of the disclosure. The embodiment illustrated in FIG. 2 is for illustration only. Other embodiments could be used without departing from the scope of this disclosure.

The vibration detection system 200 can be an embodiment of the vibration detection system 102 of FIG. 1. The vibration detection system 200 comprises an optical transmitter 202, an optical receiver 204, and an optical assembly 226. The optical transmitter 202 and the optical receiver 204 are co-located at a central facility with no active components connected between the optical transmitter 202 and the optical receiver 204 via the optical assembly 226.

The optical transmitter 202 includes a laser, wherein the output signal of the laser is modulated based on one or more radio frequency (RF) signal inputs. Output of the laser including the one or more RF signals is transmitted via the optical fiber 210 of the optical assembly 226. The optical transmitter 202 can comprise any suitable laser to provide an optical signal, such as lasers, with a wavelength of 1310 or 1550 nanometers (nm), but is not limited to these wavelengths. Certain embodiments can include multiple optical transmitters as a part of the optical transmitter 202, which is advantageous for larger installations. Certain embodiments can include the use of multiple laser wavelengths.

Certain embodiments of the vibration detection system 200 use the output signal of the laser without modulating based on an RF signal input. Without the RF signal, only optical power is measured.

The optical receiver 204 includes one or more channels. The channels include respective receivers 206 to 208 that each include a photodiode. The photodiode of each of the receivers 206 to 208 receives optical signals from one of the optical fibers 212 to 214, which corresponds to signals from one of the vibration sensors 222.

The optical assembly 226 comprises the optical fibers 210-214, 218, and 224; a multi fiber optical cable 216; an optical splitter 220; and vibration sensors 222. The optical assembly 226 is configured to be buried under ground. Certain embodiments can have the optical assembly 226 above ground and coupled to ground with stakes, i.e., without burying the optical assembly 226 underground. The optical assembly 226 is configured to receive at least one optical signal from the optical transmitter 202, route at least one optical signal along an expanse of land through the optical splitter 220 and the vibration sensors 222, and send optical signals modified via the vibration sensors 222 to the optical receiver 204 so as to detect vibration and activity along the expanse of land.

The optical fibers 210-214, 218, and 224 are single mode fibers that connect the passive components of the optical assembly 226 to active components, such as the optical transmitter 202 and the optical receiver 204. Use of single mode fiber (SMF) allows for long distance installations that can span several hundred miles or kilometers. Single mode fiber is very sensitive to misalignment between fiber couplings.

The multi fiber optical cable 216 is an aggregation of at least a portion of the optical fibers 210-214, 218, and 224 configured to allow for easier deployment of pluralities of the vibration sensors 222. The multi fiber optical cable 216 can be a ribbon fiber that comprises the optical fibers 210-214, 218, and 224 with a plurality of the vibration sensors 222 distributed along the multi fiber optical cable 216 to detect vibration at different locations along a length of the multi fiber optical cable 216. Certain embodiments can replace the ribbon fiber with multiple strands of separate fibers.

The optical splitter 220 is a passive component configured to split an incoming optical signal into multiple optical signals to be carried via the optical fibers 224. The optical splitter 220 receives an original signal from the optical transmitter 202 via the optical fiber 218, splits the original signal into multiple signals, and sends the multiple signals to the vibration sensors 222 via the optical fibers 224.

The vibration sensors 222 each comprise a set of ferrules or a V groove block configured to detect vibration via oscillations of optical fiber. Each vibration sensor 222 modifies an input signal and to generate an output signal that fluctuates based on vibration of the vibration sensor. The output signal comprising fluctuations is sent to and received by the optical receiver 204 via the optical fibers 212-214 and 224. Fluctuations of optical signals allow for the vibration detection system 200 to detect underground vibrations that are related to activity related to an underground tunnel.

Figure 3:
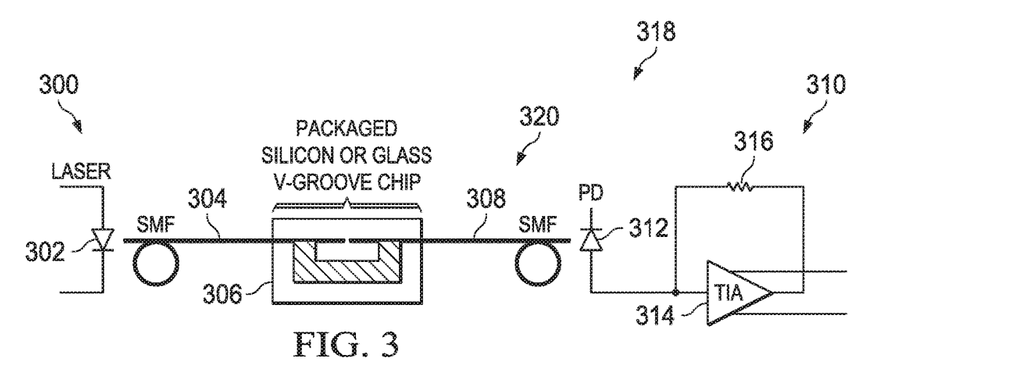
FIG. 3 illustrates a single channel of a vibration detection system according to an embodiment of the disclosure.

FIG. 3 illustrates a single channel 318 of a vibration detection system according to an embodiment of the disclosure. The embodiment illustrated in FIG. 3 is for illustration only. Other embodiments could be used without departing from the scope of this disclosure.

The channel 318 is an embodiment of a channel of the vibration detection system 100 of FIG. 1 and the vibration detection system 200 of FIG. 2. The channel 318 comprises an optical transmitter 300, an optical assembly 320, and an optical receiver 310. The channel 318 detects underground vibrations via a vibration detector 306.

The optical transmitter 300 comprises a diode laser 302. The diode laser 302 transmits an optical signal modulated with an RF signal into an optical fiber 304 to be modified by the vibration detector 306.

The optical assembly 320 comprises the optical fiber 304, the vibration detector 306, and an optical fiber 308. The optical assembly 320 receives an optical signal from the optical transmitter 300 via the optical fiber 304, modifies the optical signal based on vibrations detected by the vibration detector 306, and sends the modified optical signal to the optical receiver 310 via the optical fiber 308.

The optical fibers 304 and 308 are single mode optical fibers suitable for deployment over long distances. The loop in the illustration of each of the optical fibers 304 and 308 indicates that the fiber can be extremely long, on the order of several hundred miles or kilometers so that the vibration detector 306 can be disposed very far away from a centralized facility comprising the optical transmitter 300 and the optical receiver 310.

The vibration detector 306 is illustrated as a V groove block. The vibration detector 306 detects vibration via vibration of free standing fiber ends of each of the optical fibers 304 and 308 that are within the vibration detector 306. Small vibrations to the vibration detector 306 cause misalignments of the free standing fiber ends, causing optical power fluctuations that can be received and detected by the optical receiver 310.

The optical receiver 310 comprises a photodiode 312, an amplifier 314, and a resistor 316. The optical receiver 310 receives the modified optical signal sent via the vibration detector 306 and converts the modified optical signal into a modified RF signal. The modified RF signal is a modified version of the original RF signal, wherein the modification of the modified RF signal is based on the vibrations received by the vibration detector 306. Sending the RF signal via an optical signal via the optical assembly 320 makes the photodiode twice as sensitive because of the square law detection of the RF signal on the photodiode. The original RF signal can be a clock signal.

Certain embodiments may include threshold detection. When a modified RF signal meets a certain threshold, an alarm is triggered to indicate that a significant vibration has been detected. More sophisticated circuits can be implemented to monitor vibration amplitude by sensing amplitude changes of the modified RF signal. This could also be used to monitor earthquakes and study wave propagation in the ground. Using a larger number of sensors could even allow the use of echo location techniques for underground imaging.

Certain embodiments can have multiple vibration sensors on each optical fiber. Fluctuations from different vibration sensors on a same optical fiber can be distinguished by each vibration sensor being tuned to a different resonant frequency.

Figure 4:
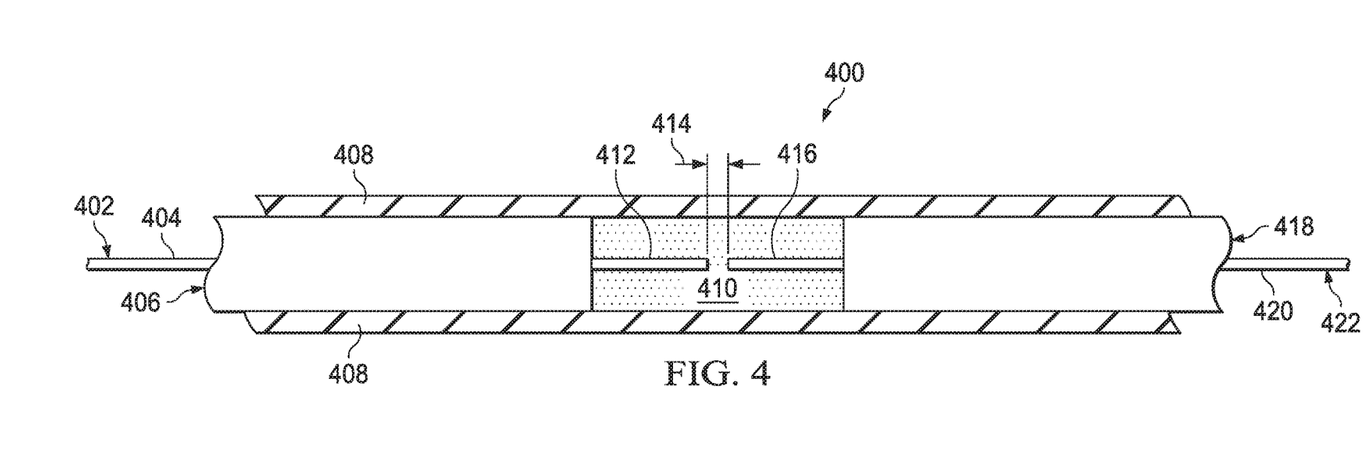
FIG. 4 illustrates a vibration detector according to an embodiment of the disclosure.

FIG. 4 illustrates a vibration detector 400 according to an embodiment of the disclosure. The embodiment illustrated in FIG. 4 is for illustration only. Other embodiments could be used without departing from the scope of this disclosure.

The vibration detector 400 is a passive element that is embodied as a sleeve 408 and a set of aligned ferrules 406 and 418 through which optical fibers 402 and 420 pass. The vibration detector 400 modifies an optical signal via a first fiber, such as the optical fiber 402, and sends a modified optical signal via a second fiber, such as the optical fiber 420, wherein the optical signal is modified based on movement or vibrations detected by the vibration detector 400.

The sleeve 408 contains the ferrules 406 and 408, comprises a space 410, and is made from any suitable material, such as ceramic. The sleeve 408 secures and aligns the ferrules 406 and 408 to secure and align the optical fibers 402 and 422.

The space 410 is within the sleeve 408 and between the ferrules 406 and 418. The space 410 allows for ends 412 and 416 of the optical fibers 402 and 422 room to move or vibrate based on movement or vibration of the vibration detector 400.

The ferrules 406 and 418 each comprise a hole through which an optical fiber can be passed, such as the optical fiber 402 or 422. The ferrules 406 and 418 are made of suitable material such as ceramics glass or metal, wherein ceramics or glass can be chosen to have a coefficient of thermal expansion that is substantially similar to that of a fiber contained within each of the ferrules 406 and 418. The ferrules 406 and 408 secure and align the optical fibers 402 and 422 and provide enough rigidity to prevent stress from the sleeve 408 from affecting the optical fibers 402 and 422. The ferrules 406 and 408 prevent movement of the optical fibers 402 and 422 with respect to each other.

The optical fibers 402 and 422 are single mode fibers and comprise the ends 412 and 416 and portions 404 and 420. The optical fibers 402 and 422 allow for the transmission of optical signals over very long distances.

The ends 412 and 416 are separated by a distance 414. Separation of the ends 412 and 416 allow for misalignment between the optical fibers 402 and 422 as the ends 412 and 416 move in response to movements and vibrations of the vibration detector 400. Misalignment between the optical fibers 402 and 422 attenuates an input signal that is being passed through the optical fibers 402 and 422, wherein the amount of attenuation is proportional to misalignment between the optical fibers 402 and 422 and is proportional to movement or vibration of the vibration detector 400. The ends 412 and 416 are a same length so as to have a similar resonant frequency. The ends 412 and 416 may be formed by cutting or cleaving a single optical fiber to form the optical fibers 402 and 422 that are spaced the distance 414 apart, wherein movement of the cleaved fibers provide fluctuations that attenuate and modify the optical signal based on misalignment of the optical fibers. Certain embodiments can replace the cleaved fibers with one or more of laser cut fibers, tapered fibers, and lensed fiber tips.

The distance 414 is a physical distance between the ends 412 and 416. The distance 414 allows the ends 412 and 416 of the optical fibers 402 and 422 to freely move or vibrate. The distance 414 may be as small as possible but large enough so that the ends 412 and 416 do not contact each other as they move or vibrate.

Certain embodiments can have the ends 412 and 416 be of different lengths so as to resonate at different frequencies. Using different lengths and resonance frequencies allows for additional information to be captured about the movements and vibrations of the vibration detector 400.

Certain embodiments can have a first of the ends 412 and 416 extend out from its respective ferrule a certain length and a second of the ends 412 and 416 to not extend out from its respective ferrule so that only the first of the ends 412 and 416 is free to move and vibrate. Having only one end to vibrate allows for an overall size of the vibration detector 400 to be reduced at least by reducing the space 410.

Figure 5:
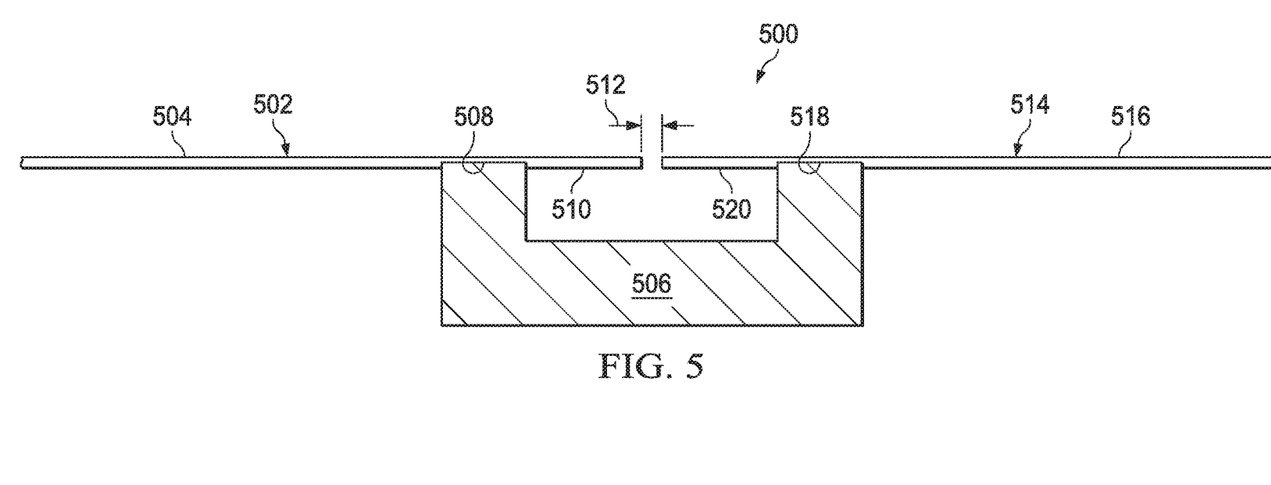
FIG. 5 illustrates a vibration detector according to an embodiment of the disclosure.

FIG. 5 illustrates a vibration detector 500 according to an embodiment of the disclosure. The embodiment illustrated in FIG. 5 is for illustration only. Other embodiments could be used without departing from the scope of this disclosure.

The vibration detector 500 is a passive element that is embodied as a V groove block comprising a support member 506 through which optical fibers 502 and 514 pass. The vibration detector 500 modifies an optical signal via a first fiber such as the optical fiber 502, and sends a modified optical signal via a second fiber, such as the optical fiber 514 wherein the optical signal is modified based on vibrations detected by the vibration detector 500.

The support member 506 comprises V-shaped grooves (V grooves) 508 and 518 for the optical fibers 502 and 514. The support member 506 is made of suitable material such as silicone, glass, ceramic or metal, wherein silicone, glass or ceramic can be chosen to have a coefficient of thermal expansion that is substantially similar to that of a fiber contained within each of the V grooves 508 and 518. The support member 506 secures and aligns the optical fibers 502 and 514. The support member 506 prevents movement of the optical fibers 502 and 514 with respect to each other.

The optical fibers 502 and 514 are single mode fibers and comprise ends 510 and 520 and portions 504 and 516. The optical fibers 502 and 514 allow for the transmission of optical signals over very long distances.

The ends 510 and 520 are separated by a distance 512. The separation of the ends 510 and 520 allow for misalignment between the optical fibers 502 and 514 as the ends 510 and 520 move in response to movements or vibrations of the vibration detector 500. Misalignment between the optical fibers 502 and 514 attenuates an input signal that is being passed through the optical fibers 502 and 514, wherein the amount of attenuation is proportional to misalignment between the optical fibers 502 and 514 and is proportional to movement or vibration of the vibration detector 500. The ends 510 and 520 are a same length so as to have a similar resonant frequency. The ends 510 and 520 may be formed by cutting or cleaving a single optical fiber to form optical fibers 502 and 514 that are spaced the distance 512 apart, wherein movement of the cleaved fibers provide fluctuations that attenuate and modify the optical signal based on misalignment of the optical fibers.

The distance 512 is a physical distance between the ends 510 and 520. The distance 512 allows the ends 510 and 520 of the optical fibers 502 and 514 to freely move or vibrate. The distance 512 may be as small as possible but large enough so that the ends 510 and 520 do not contact each other as they move or vibrate.

Certain embodiments can have the ends 510 and 520 be of different lengths so as to resonate at different frequencies. Using different lengths and resonance frequencies allows for additional information to be captured about the movements and vibrations of the vibration detector 500.

Certain embodiments can have a first of the ends 510 and 520 extend out from its respective V groove a certain length and a second of the ends 510 and 520 to not extend out from its respective V groove so that only the first of ends the 510 and 520 is free to move and vibrate. Having only one end to vibrate allows for an overall size of the vibration detector 500 to be reduced.

Figure 6:
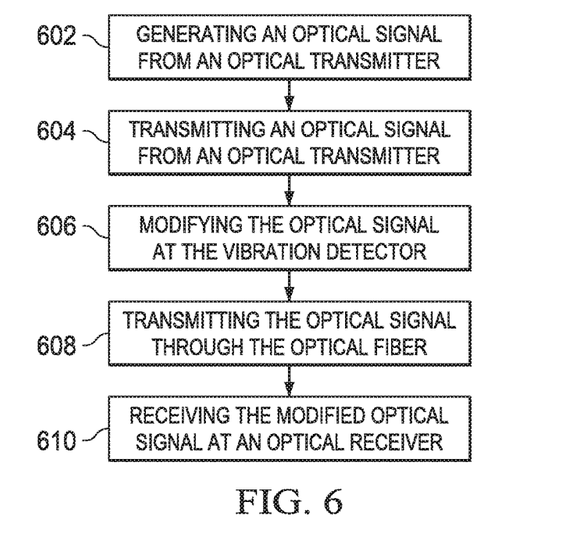
FIG. 6 illustrates a flow diagram of a vibration detection system according to an embodiment of the disclosure.

FIG. 6 illustrates a flow diagram of a vibration detection system according to an embodiment of the disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted can be implemented in, for example, a vibration detection system.

At 602, an optical signal is generated by an optical transmitter. The optical signal can be generated by a laser and be combined with an RF signal.

At 604, the optical signal is transmitted from the optical transmitter to a vibration detector. The optical signal can include the RF signal and the optical transmitter can comprise the laser.

At 606, the optical signal is modified at the vibration detector. The vibration detector can be embodied as a set of ferrules or a V groove block that comprise freely vibrating ends of optical fiber that are sensitive to movement and vibration. Movement or vibration of optical fibers within the vibration detector causes misalignment of the optical fibers so as to attenuate or modify the optical signal. Attenuation and modification of the optical signal is proportional to the amount of movement and vibration of the optical fibers and is proportional to movement and vibration of the vibration detector.

At 608 the optical signal is transmitted through the optical fiber. The optical signal is transmitted from the optical transmitter, through the vibration detector that modifies the optical signal, and to an optical receiver that receives the modified optical signal.

At 610, the modified optical signal from the vibration detector is received at an optical receiver. The optical receiver comprises a photodiode to detect the optical signal and recover an RF signal that was included with the optical signal.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A method comprising:
    sending, via an optical transmitter, an optical signal that is modified by a vibration sensor; and
    receiving, via an optical receiver, the optical signal from the vibration sensor, the received optical signal comprising fluctuations responsive to a vibration of the vibration sensor;
    wherein the optical signal includes a radio frequency (RF) signal;
    wherein an optical assembly comprises the vibration sensor and multiple optical fibers, the optical assembly configured to detect underground vibrations; and wherein the vibration sensor comprises two ends of two optical fibers in the optical assembly, the two ends of the two optical fibers separated by a gap, at least one of the ends configured to move in response to the vibration, movement of the at least one of the ends of the optical fibers causing misalignment between the ends of the optical fibers and attenuation of the optical signal.

2. The method of claim 1, wherein the optical fibers comprise single mode fibers.

3. The method of claim 1, wherein the optical fibers comprise cleaved fibers.

4. The method of claim 1, further comprising:
triggering an alarm when the RF signal received via the optical receiver meets a threshold.

5. The method of claim 1, further comprising:
monitoring an amplitude of the vibration via amplitude changes in the RF signal.

6. The method of claim 1, wherein the vibration sensor is one of a plurality of vibration sensors along a ribbon fiber of the optical assembly configured to detect vibrations at different locations.

7. The method of claim 1, wherein the optical transmitter and the optical receiver are co-located with no active components connected between the optical transmitter and the optical receiver via the optical assembly.

8. A system comprising:
an optical assembly configured to detect underground vibrations, the optical assembly comprising a vibration sensor and multiple optical fibers;
an optical transmitter configured to send an optical signal that is modified by the vibration sensor; and
an optical receiver configured to receive the optical signal from the vibration sensor, the received optical signal comprising fluctuations responsive to a vibration of the vibration sensor;
wherein the optical signal includes a radio frequency (RF) signal; and
wherein the vibration sensor comprises two ends of two optical fibers in the optical assembly, the two ends of the two optical fibers separated by a gap, at least one of the ends configured to move in response to the vibration such that movement of the at least one of the ends of the optical fibers causes misalignment between the ends of the optical fibers and attenuation of the optical signal.

9. The system of claim 8, wherein the optical fibers comprise single mode fibers.

10. The system of claim 8, wherein the optical fibers comprise cleaved fibers.

11. The system of claim 8, wherein, when the RF signal received via the optical receiver meets a threshold, an alarm is triggered.

12. The system of claim 8, wherein an amplitude of the vibration is monitored via amplitude changes in the RF signal.

13. The system of claim 8, wherein the vibration sensor is one of a plurality of vibration sensors along a ribbon fiber of the optical assembly configured to detect vibrations at different locations.

14. The system of claim 8, wherein the optical transmitter and the optical receiver are co-located with no active components connected between the optical transmitter and the optical receiver via the optical assembly.

15. An apparatus comprising:
an optical transmitter configured to send an optical signal that is modified by a vibration sensor; and
an optical receiver configured to receive the optical signal from the vibration sensor, the received optical signal comprising fluctuations responsive to a vibration of the vibration sensor;
wherein the optical signal includes a radio frequency (RF) signal;
wherein an optical assembly comprises the vibration sensor and multiple optical fibers, the optical assembly configured to detect underground vibrations; and
wherein the vibration sensor comprises two ends of two optical fibers in the optical assembly, the two ends of the two optical fibers separated by a gap, at least one of the ends configured to move in response to the vibration, movement of the at least one of the ends of the optical fibers causing misalignment between the ends of the optical fibers and attenuation of the optical signal.

16. The apparatus of claim 15, wherein the optical fibers comprise single mode fibers.

17. The apparatus of claim 15, wherein the optical fibers comprise cleaved fibers.

18. The apparatus of claim 15, wherein, when the RF signal received via the optical receiver meets a threshold, an alarm is triggered.

19. The apparatus of claim 15, wherein an amplitude of the vibration is monitored via amplitude changes in the RF signal.

20. The apparatus of claim 15, wherein the vibration sensor is one of a plurality of vibration sensors along a ribbon fiber of the optical assembly configured to detect vibrations at different locations.

21. The apparatus of claim 15, wherein the optical transmitter and the optical receiver are co-located with no active components connected between the optical transmitter and the optical receiver via the optical assembly.

22. The method of claim 1, wherein the two ends of the two optical fibers represent free fiber ends of different lengths and are configured to resonate at different frequencies.

* * * * *